3,374,269
PROCESS OF PRODUCING
3,5-DIIODOTHYRONINES
Franz Langer, Vienna, Austria., assignor, by mesne assignments, to Sandoz Ltd. (also known as Sandoz A.G.), Basel, Switzerland
No Drawing. Filed Jan. 2, 1964, Ser. No. 335,387
Claims priority, application Austria, Jan. 9, 1963, A 173/63
14 Claims. (Cl. 260—519)

ABSTRACT OF THE DISCLOSURE

A process of producing 3,5-diiodothyronines by converting 3,5-diiodotyrosine to a complex of divalent metal cations and reacting the complex in the presence of bases such as alkali metal hydroxides and alkoxides and organic nitrogen compounds, with 4,4'-dialkoxy-diphenyl-iodonium salts and then dealkylating to the corresponding 3,5-diiodothyronine.

---

The present invention relates to a process for producing 3,5-diiodothyronines.

It is one object of the present invention to provide a simple and effective process of producing such valuable compounds.

A further object of the present invention is to provide a complete synthesis of the diiodothyronine from diiodotyrosine as starting product in two stages.

Other objects of the present invention will become apparent as the description proceeds.

3,5-diiodothyronines, which are key compounds in the production of the therapeutically valuable triiodothyronines and tetraiodothyronines, are known to be accessible by two methods involving several stages (J. R. Chalmers et al., J. Chem. Soc., 1949, page 3424; W. Siedel and H. Nahm, Medizin und Chemie, vol. VI, page 249, Frankfurt 1958). Recently yet another method has been described (G. Hillmann, Zeitschr. f. Naturforschung, 11b, page 419, 1956) which permits the 3,5-diiodo-L-thyronine to be produced in four stages. In this method L-diiodotyrosine is first acetylated at the amino group, the resultant acetyl product being esterified and the N-acetyl-L-diiodotyrosine ethylester coupled with 4,4'-dimethoxy-diphenyl-iodonium salts in the presence of alcoholates in methanol to form the 3,5-diiodo-4-p-methoxy-phenoxy-N-acetyl-L-phenylalanine ethylester. Vigorous hydrolysis by HBr glacial acetic acid then leads to the 3,5-diiodo-L-thyronine.

Furthermore, U.S. patent specification No. 2,895,927 describes a method of producing alkylesters of O-methyl-N-acetyl-3,5-diiodo-L-thyronine, which consists in condensing a di-(p-anisyl)-iodonium halide with N-acetyl-3,5-diiodo-L-tyrosine alkylesters in an alkaline medium in the presence of copper or copper salts. The purpose of the copper or copper salt in this method is to accelerate the condensation of di-(p-anisyl)-iodonium halide with the N-acetyl-3,5-diiodo-L-tyrosine alkylesters. However, in this reaction between the two components the 3,5-diiodo-L-tyrosine must be made available in the form of the N-acetylalkylate. Nevertheless, the inclusion of this step in the synthesis of L-3,5-diiodo-thyronine from L-diiodotyrosine still necessitates the performance of four stages, as in Hillmann's method.

According to the present invention it has now been found that good yields of the 3,5-diiodothyronines (3,5-diiodo-D-thyronine, 3,5-diiodo-L-thyronine and the 3,5-iodo-D,L-thyronine) can be easily obtained from the corresponding diiodotyrosine by reacting metal complexes of diiodotryrosine in the presence of bases, preferably alkali hydroxides or organic nitrogen compounds, e.g. tri-n-butylamine, n-butylamine, triethylamine or N-ethylpiperidine, with 4,4'-dialkoxy-diphenyl-iodonium salts and, after isolation of the resultant 3,5-diiodo-4-p-alkoxy-phenoxy-phenylalanine, for example in the form of the hydrohalide, dealkylating the same to 3,5-diiodothyronine.

The following formulae which relate to the use of the 4,4'-dimethoxy-diphenyl-iodonium compound exemplify the proposed reaction scheme:

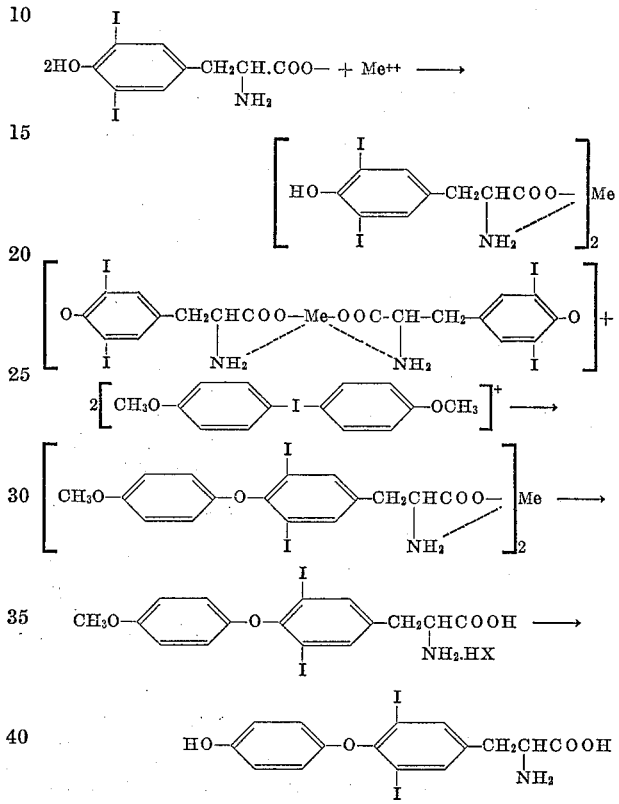

Suitable metal complexes for performing the invention are, more particularly, complexes of divalent metals, preferably of copper, nickel or cobalt. However, complexes of mercury, zinc, manganese, cadmium and the like are likewise applicable.

Suitable 4,4'-dialkoxy-diphenyl-iodonium salts for performing the invention are, more particularly, iodonium salts containing 1 to 5 carbon atoms in the alkoxy group. The dimethoxy or diethoxy compounds are preferred.

The 3,5-diiodo-4-p-alkoxy-phenoxy-phenylalanine may be dealkylated to the corresponding 3,5-diodothyronine in a manner which as such is known to the art. HI-glacial acetic acid is especially useful for performing the dealkylation. Nevertheless, alternative dealkylating agents can be used, such as HBr-glacial acetic acid or HCl-HI-glacial acetic acid.

In a preferred embodiment of the invention the 3,5-diodothyronines may be produced without first isolating the diiodotyrosine metal complex so that the complete synthesis of the diiodothyronine from diiodotyrosine as the starting product can be completed in two stages. Apart from a considerable saving in time and materials the process proposed by the invention has the further advantage of permitting the reactions to be performed in aqueous solution and the product of the method to be easily separated from the initial diiodotyrosine. The latter can be readily used for a fresh reaction. The yields of 3,5-diiodothyronine thus obtained are roughly 50 to 60% of theory, related to the 3,5-diiodotyrosine introduced.

For producing the diiodotyrosine metal complex any of the usual cations which form complexes with aminoacids can be employed (J. P. Greenstein and M. Winitz, Chemistry of the Aminoacids, vol. I, page 569, New York, 1961). The use of $Cu^{++}$ has proved to be particularly advantageous.

Following is a description by way of example of a process of carrying the invention into effect.

EXAMPLE (A) *The production of the diiodotyrosine metal complexes*

A solution in water of 1 equivalent of a complex-forming metal salt is added at room temperature to a solution of 1 mol of the corresponding 3,5-diiodotyrosine in 8 liters of water and 1 equivalent of sodium hydroxide, the mixture being stirred. The precipitate is separated in a centrifuge, thoroughly washed with water and dried. The yields of metal complex usually exceed 90% of theory.

(B) *The production of the 3,5-diiodo-4-p-methoxy-phenoxy-phenylalanines*

(a) 31.5 g. of Cu-3,5-diiodo-D,L-tyrosine are dissolved in 1500 ml. of methanol by adding 12.8 g. of triethylamine. 1.05 g. of Cu-bronze and 85.5 g. of di-p-anisyl iodonium bromide are then added and the mixture is stirred for 65 hours under nitrogen. The precipitate is separated on a suction filter, washed well with methanol and dissolved in a mixture of 100 ml. of methanol and 15 ml. of a concentrated hydrochloric acid. After filtration the 3,5-diiodo-4 - p - methoxy - phenoxy - D,L - phenylalanine hydrochloride is precipitated with 700 ml. of water. The reaction product can be further purified by dissolving it in methanolic hydrochloric acid and precipitating with water. M.P.=215–220° C. (decomp.).

(b) 8.0 g. of Cu-3,5-diiodo-L-tyrosine are dissolved in a mixture of 300 ml. of methanol and 2.3 g. of N-ethylpiperidine, 14.5 g. of p,p′-dimethoxy-diphenyl-iodonium bromide and 300 mg. of Cu-bronze being added and the mixture stirred for 24 hours at room temperature under nitrogen. After addition of 10 ml. of concentrated hydrochloric acid the solution is filtered, concentrated in a vacuum to a volume of about 30 ml., diluted with 50 ml. of ether and 50 ml. of water and cooled in ice for several hours. The 3,5 - diiodo - 4-p-methoxy-phenoxy-L-phenylalanine hydrochloride is then separated on a suction filter and thoroughly washed with ether and a very dilute hydrochloric acid. M.P.=227–230° C. (decomp.).

(c) A solution of 9.24 g. of Ni-3,5-diodo-L-tyrosine and 2.7 ml. of triethylamine in 500 ml. of methanol is combined with 16.8 g. of p,p′-dimethoxy-diphenyl-iodonium bromide and 350 mg. of Cu-bronze and stirred at room temperature under nitrogen for 6 days. After addition of 15 ml. of a concentrated hydrochloric acid the solution is filtered, reduced in a vacuum to a volume of 150 ml. and diluted with 150 ml. of a 10% hydrochloric acid. After having been allowed to stand on ice the precipitate is filtered off by suction, the 3,5 - diiodo-4-p-methoxy-phenoxy-L-phenylalanine hydrochloride being thoroughly washed with ether and a very dilute hydrochloric acid. M.P.=225–230° C. (decomp.).

The reaction and isolation when using Co-3,5-diiodo-L-tyrosine are performed in analogous manner.

(d) 21.5 g. of Cu-3,5-diiodo-D-tyrosine are dissolved in 250 ml. of water with an addition of 47 ml. of a N-solution of NaOH. 20.0 g. of p,p′-dimethoxy-diphenyl-iodonium bromide and 700 mg. of Cu-bronze are then introduced and the mixture is stirred at room temperature under nitrogen for 7 days. 25 ml. of a concentrated hydrochloric acid and 150 ml. of ether are added and the 3,5-diiodo-4-p-methoxyphenoxy-D-phenylalanine hydrochloride which has formed is subsequently removed on a suction filter. The product is purified by thorough washing in dilute HCl and ether followed by reprecipitation from an aqueous methanolic hydrochloric acid. M.P.=227–230° C. (decomp.).

(e) 21.7 g. of 3,5-diiodo-L-tyrosine are suspended in 250 ml. of water. A suspension in 250 ml. of water of copper hydroxide (prepared from 12.5 g. of $CuSO_4.5H_2O$ and 25 ml. of a 4 N-solution of sodium hydroxide) which has previously been well washed with water is added and the mixture stirred for some minutes. 7.6 ml. of triethylamine are fed into the mixture, nitrogen is bubbled through and 22 g. of 4,4′-dimethoxy-diphenyl-iodonium bromide are added. Whilst vigorous stirring continues the mixture is heated to a temperature of 60° C. which is maintained for 30 minutes. 200 ml. of benzene and 20 ml. of concentrated hydrochloric acid are then fed into the mixture and stirring is continued for a while whilst the mixture cools in ice. The precipitated 3,5-diiodo-4-p-methoxy-phenoxy-L-phenylalanine hydrochloride is removed on a suction filter, thoroughly washed with benzene and dilute hydrochloric acid and finally purified as already described. M.P.=227–230° C. (decomp.). The benzene phase is separated from the mother liquor, the aqueous phase is shaken out with benzene again and the copper is then precipitated in the form of the sulphide by introducing hydrogen sulphide. The solution remaining after filtration is concentrated in vacuo and treated with active carbon. Adjustment of the pH to between 3.5 and 4.0 causes unreacted 3,5-diiodo-L-tyrosine to precipitate. This contains minor quantities of 3,5-diiodo-4-p-methoxy-phenoxy-L-phenylalanine and can be used for performing the described reaction again.

(f) 30.3 g. of 3,5-diiodo-L-tyrosine are reacted in 700 ml. of $H_2O$ with copper hydroxide (prepared from 17.5 g. of $CuSO_4.5H_2O$) under nitrogen to obtain the copper complex. Whilst vigorous stirring 10.6 ml. of triethylamine and 33.2 g. of 4,4′-dimethoxydiphenyl-iodonium-iodide are added and the mixture is heated 30 minutes to a temperature of 60° C. After an addition of 280 ml. benzene and 70 ml. of concentrated HCl 3,5-diiodo-4-p-methoxy-phenoxy-L-phenylalanine hydrochloride is isolated. The product is purified by reprecipitation from an aqueous methanolic hydrochloric acid.

(g) 21.7 g. of 3,5-diiodo-L-tyrosine and copper hydroxide (obtained from 12.5 g. of $CuSO_4.5H_2O$) which has previously been well washed with water, are suspended in a mixture of 500 ml. of water and 600 ml. of methanol; nitrogen is bubbled through and 9.7 g. of tri-N-butylamine as well as 22 g. of p,p′-dimethoxy-diphenyl-iodonium bromide are added. Whilst vigorous stirring the mixture is heated to a temperature of 60° C., which is maintained for 30 minutes. 20 ml. of concentrated hydrochloric acid are then fed into the mixture while the mixture cools in ice 18.0 g. of practically colourless 3,5-diiodo - 4 - p - methoxy - phenoxy - L - phenylalanine hydrochloride are obtained.

(h) In analogous manner as described sub (g) using 4.0 g. of N-butylamine as base and 500 ml. of $H_2O$ as solvent. There are obtained 12.7 g. of 3,5-diiodo-4-p-methoxy-phenoxy-L-phenylalanine hydrochloride.

(i) A solution of alkalialcoholate is prepared, e.g. by dissolution of 1.1 g. of sodium metal in 200 ml. of abs. methanol; this solution is combined with 18.6 g. of Cu-3,5-diiodo-L-tyrosine, 600 mg. of Cu-bronze and 33.7 g. 4,4′-dimethoxy-diphenyl-iodonium bromide. After having been stirred at room temperature under nitrogen the product is isolated and purified as described above and the 3,5 - diiodo - 4 - p - methoxy - phenoxy - L - phenylalanine hydrochloride is obtained.

(BB) *The production of the 3,5-diiodo-4-p-ethoxy-phenoxy-phenylalanines*

21.7 g. 3,5-diiodo-L-tyrosine and copper hydroxide (prepared from 12.5 g. of $CuSO_4.5H_2O$ and 25 ml. of a 4 N-solution of NaOH which has been previously well washed with water are added under nitrogen in 500 ml. of water and 14 ml. triethylamine are fed into the mixture whilst stirring; 45 g. of 4,4′-diethoxy-diphenyl-iodonium bromide are then added and the mixture is heated to a temperature of 60° C., which is maintained for 30 minutes. 20 ml. of concentrated HCl are slowly added to obtain the sparingly soluble 3,5-diiodo-4-p-ethoxy-phenoxy-L-phenylalanine hydrochloride, which is removed on a suction filter after having been allowed to stand on ice; the product is well washed with benzene and diluted hydrochloric acid. Yield: 66% of theory. The product is purified by reprecipitation from an aqueous methanolic hydrochloric acid. M.P=233–234° C. (decomp.).

*Analysis.*—Calculated: J=43.1%, N=2.4%. Found: J=43.7%, N=2.4%.

(C) *The production of the 3,5-diiodothyronines*

(a) 15 g. of 3,5-diiodo-4-p-methoxy-phenoxy-(D or L or D,L)-phenylalanine or its hydrochloride are refluxed for four hours in a mixture of 30 ml. of hydroiodic acid (d.=1.7) and 30 ml. of glacial acetic acid. The solution is evaporated in vacuo until dry, the residue being dissolved in hot ethanol and the corresponding 3,5-diiodothyronine precipitated with a hot solution of 30 g. of sodium acetate and 0.8 g. of $Na_2S_2O_5$ in 100 ml. of water. The precipitate collected on a suction filter after extended cooling is thoroughly washed with water. Yield about 95% of theory.

3,5-diiodo-L-thyronine, M.P=242–246° C. (decomp.); $[\alpha]_D^{20}=+27.5°$ (c.=1; N-HCl/ethanol=1:2).
3,5-diiodo-D-thyronine, M.P.=240–245° C. (decomp.); $[\alpha]_D^{20}=-27.5°$ (c.=1; N-HCl/ethanol=1:2).
3.5-diiodo-D,L-thyronine, M.P.=250–252° C. (decomp.).

(b) 20 g. of 3,5-diiodo-4-p-ethoxy-phenoxy-L-phenylalanine hydrochloride, 80 ml. of glacial acetic acid, 80 ml. of hydroiodic acid (d.=1.7) and 0.5 g. of red phosphorus are refluxed for 3 hours in a bath heated at 145° C. Thereafter the solution is concentrated to dryness in a vacuum; the residue as obtained is dissolved in 140 ml. of ethanol and filtered. A hot solution of 30 g. of sodium acetate and 1 g. of $Na_2S_2O_5$ in 100 ml. water is added. 16.6 g. of 3,5-diiodo-L-thyronine having a melting point of 251 to 252° C. (decomp.), $[\alpha]_D^{20}=+27.5°$ (c.=1; N-HCl/96% ethanol=1:2) are obtained.

(c) In a mixture of 200 ml. of hydrobromic acid (48%) and 200 ml. of glacial acetic acid are introduced 100 g. of 3,5-diiodo-4-p-methoxy-phenoxy-D,L-phenylalanine hydrochloride and the mixture is refluxed for 24 hours. The solution is evaporated in vacuo until dry. The residue being dissolved in 700 ml. of ethanol and a hot solution of sodium acetate in water is added up to a pH-value of 5 is reached. Yield: about 95% of theory.

I claim:
1. A process of producing 3,5-diiodothyronines, said process consisting essentially of the steps of converting a 3,5-diiodotyrosine selected from the group consisting of racemic and optically active 3,5-diiodotyrosine to a complex of divalent metal cations which form complexes with aminoacids, reacting said complex in the presence of bases selected from the group consisting of alkali metal hydroxides, alkali metal alkoxides, tri-n-butylamine, n-butylamine, triethylamine, and N-ethylpiperidine, with 4,4'-dialkoxy-diphenyl-iodonium salts to form 3,5-diiodo-4-p-alkoxy-phenoxy-phenylalanine and dealkylating the latter by means of a hydrohalic acid containing dealkylating agent to the corresponding 3,5-diiodothyronine.

2. A process as claimed in claim 1 wherein the diiodotyrosine metal complex is reacted to form the 3,5-diiodo-4-p-alkoxy-phenoxy-phenylalanine without being isolated.

3. A process as claimed in claim 1 wherein the divalent metal is copper.

4. A process as claimed in claim 1 wherein the divalent metal is nickel.

5. A process as claimed in claim 1 wherein the divalent metal is cobalt.

6. A process as claimed in claim 1 wherein the 4,4'-dialkoxy-diphenyl-iodonium salts are salts containing 1 to 5 carbon atoms in the alkoxy group.

7. A process as claimed in claim 6 wherein the 4,4'-dialkoxy-diphenyl-iodonium salts are dimethoxy compounds.

8. A process as claimed in claim 6 wherein the 4,4'-dialkoxy-diphenyl-iodonium salts are diethoxy compounds.

9. A process as claimed in claim 1 wherein the base is an alkali metal hydroxide.

10. A process as claimed in claim 1 wherein the base is an alkali metal alkoxide.

11. A process as claimed in claim 1 wherein the base is triethylamine.

12. A process as claimed in claim 1 wherein the base is N-ethylpiperidine.

13. A process as claimed in claim 1 wherein the base is N-butylamine.

14. A process as claimed in claim 1 wherein the base is tri-N-butylamine.

References Cited

UNITED STATES PATENTS 2,895,927  7/1959  Bevilacqua et al. _____ 260—519

LORRAINE A. WEINBERGER, *Primary Examiner.*

L. A. THAXTON, *Assistant Examiner.*